(12) United States Patent
Wong (10) Patent No.: US 11,522,918 B1
(45) Date of Patent: Dec. 6, 2022

(54) SECURELY COMMUNICATING ORGANIZATIONAL SECURITY POLICIES BETWEEN MOBILE DEVICES

(71) Applicant: Sze Yuen Wong, Herndon, VA (US)

(72) Inventor: Sze Yuen Wong, Herndon, VA (US)

( * ) Notice: Subject to any disclaimer, the term of this patent is extended or adjusted under 35 U.S.C. 154(b) by 0 days.

(21) Appl. No.: 17/004,049

(22) Filed: Aug. 27, 2020

(51) Int. Cl.
*H04L 9/40* (2022.01)
*H04L 29/06* (2006.01)

(52) U.S. Cl.
CPC .......... *H04L 63/20* (2013.01); *H04L 63/0421* (2013.01); *H04L 63/105* (2013.01)

(58) Field of Classification Search
CPC .... H04L 63/20; H04L 63/0421; H04L 63/105
USPC ............................................................ 726/1
See application file for complete search history.

(56) References Cited

U.S. PATENT DOCUMENTS

| | | | | |
|---|---|---|---|---|
| 7,564,812 B1 * | 7/2009 | Elliott | ............... | H04W 48/08 370/329 |
| 8,452,965 B1 * | 5/2013 | Griffin | ............ | G06F 21/6272 713/172 |
| 2014/0052999 A1 * | 2/2014 | Aissi | .................. | H04L 9/08 713/189 |
| 2018/0007048 A1 * | 1/2018 | Weaver | ................ | H04L 63/10 |
| 2018/0255101 A1 * | 9/2018 | Adam | .................. | H04L 63/10 |

* cited by examiner

*Primary Examiner* — Michael S McNally

(57) ABSTRACT

An apparatus comprises a network node, a random number generator, and a message generator to schedule transmission of a beacon message, wherein an administrative rule engine applies appropriate security safeguards to modify PII collection policies of the node. The node having an application collecting data to reside in at least one segregated data storage. The application comprises a distinguishing module, a de-identification module, an anonymization module, a minimum collection module, a minimum retention module, and a categorization module. The random number generator generates random times for transmitting the beacon message and for generating random channels for transmitting the beacon message. The message generator generates the beacon message, which includes dynamic configuration updates for the administrative rule engine, wherein the dynamic configuration updates comprises obligations to protect confidentiality, context of use, user assignments, permission assignments, role hierarchy relations, access authorizations, access restrictions, and job duties.

11 Claims, 12 Drawing Sheets

| 901 Transmitting Node ID |||
|---|---|---|
| 902 Transmitting Node Schedule |||
| | 903 Next Tx Time #1 | 904 Next Tx Channel #1 |
| | 903 Next Tx Time #2 | 904 Next Tx Channel #2 |
| | ⋮ | |
| | 903 Next Tx Time #N | 904 Next Tx Channel #N |
| 912 Dynamic Constraints Update |||
| | 913 Access Authorization | 914 Edit PII by Device Owner |
| | 913 Access Restriction | 914 Disclosure for Worker's Compensation Purpose |
| | ⋮ | |
| | 913 Job Duty | 914 Accounting Clerk approves_Invoice |
| 905 Checksum or other Forward Error Correction |||

| 1201 Transmitting Node ID |  |
| --- | --- |
| 1202 Transmitting Node schedule | |

| 1203 Next Tx Time #1 | 1204 Next Tx Channel #1 |
| --- | --- |
| 1203 Next Tx Time #2 | 1204 Next Tx Channel #2 |
| ⋮ | |
| 1203 Next Tx Time #N | 1204 Next Tx Channel #N |

| 1206 Other schedules |
| --- |
| 1207 Other schedule #1 |

| 1209 Node ID | |
| --- | --- |
| 1203 Next Tx Time #1 | 1204 Next Tx Channel #1 |
| 1203 Next Tx Time #2 | 1204 Next Tx Channel #2 |
| ⋮ | |
| 1203 Next Tx Time #N | 1204 Next Tx Channel #N |

⋮

| 1208 Other schedule #2 |
| --- |
| 1212 Dynamic Constraints Update |

| 1213 Next Tx Time #N | 1214 Edit PII by Device Owner |
| --- | --- |
| 1213 Next Tx Time #N | 1214 Disclosure for Worker's Compensation Purpose |
| ⋮ | |
| 1213 Next Tx Time #N | 1214 Accounting Clerk approves Invoice |

| 1205 Checksum or other Forward Error Correction |
| --- |

FIG. 12

SECURELY COMMUNICATING ORGANIZATIONAL SECURITY POLICIES BETWEEN MOBILE DEVICES

FIELD OF THE INVENTION

The present invention relates to a method and apparatus for communicating security configuration among mobile enterprise devices, and more particularly, to data collection using mobile enterprise devices without internet connection.

BACKGROUND OF THE INVENTION

Businesses routinely generate workflows and collect information as an important component of their operations. Recent developments in wireless computing have made them ever more relevant in businesses such as Environmental engineering, whether dealing with waste treatment, water or air purification or the remediation of contaminated sites, better decision making and plans of action begin with solid data. Wireless data collection systems allow field teams to compile critical information in a flexible, integrative wireless environment, without manually enter them into a database. For civil engineers, regardless of the specialty, accurate, timely inspections are critical. Being able to perform inspections in the fields can minimize time while increasing overall accuracy of the data gathered and resulting reports, all in a fully customized, BYOD environment.

An "ad hoc" wireless field solution is typically used to meet the unique challenges of the local environment. In an "ad hoc" partitioned wireless network, all nodes of the network are equipped with wireless communications transceivers. Some of the nodes, commonly known as routers or switches (hereinafter referred to as "routers"), are capable of directing traffic (messages) on the network, e.g., network routing functions. Other of the nodes, commonly known as "endpoints," are sources and/or destinations of data traffic. In the past, various technologies may have been used to implement various tasks, including various workflow and data collection solutions. Instruments and methods traditionally require that a stationary object of known dimension be observed and such an object is not always available and may not even be desirable in a wireless survey that require flexible to conduct survey with moving subjects in the field. Given today's expectation in advanced engineering technologies, a lack of internet connection must not be a problem. Disconnected field teams need to be able to save data directly to their devices in the absence of internet, which automatically synchronized to a team-based mobile endpoint when the enumerators were in an area that had network coverage for control and analysis purposes. The workflows may include one or more questions to be answered and/or tasks to be performed. Information may include answers to the questions, status of the tasks to be performed, and/or other information collected by the business. Businesses may even generate survey questionnaires to elicit responses designed to understand how their customers and/or other individuals feel about a particular topic.

In addition to technical expectations, users in recent years also have high expectations in the context of business actions. A business may need to take into consideration the nature of authorized access to personally identifying information (PII). When PII is accessed more often or by more people and systems, there are more opportunities for the confidentiality of the PII to be compromised. Businesses may also need to consider whether PII is being stored on or accessed from wireless devices or other systems outside the direct control of the business, and whether extra safeguards are needed to help mitigate the increased risk caused by the nature of the access to widely-accessed PII than would otherwise be needed.

It can be challenging to apply appropriate safeguards to protect the confidentiality of PII where networks of nodes may have been split apart into two or more portions, where the different portions do not hear one another. For example, one group of wireless radio nodes may have gone to one side of a hill, while another group went to the other side, and when these two groups emerge back in radio range of one another, they need to learn of each other's existence and of the beacon schedules for any of the radio nodes in the other partition. Each node in an "ad hoc" wireless network typically executes a set of algorithms and conforms to a set of networking protocols which enable the nodes to locate other nodes. The protocols also enable the nodes to determine paths through the network for sending and receiving data traffic from source to destination. Additionally, the protocols enable the nodes to detect changes and/or repair ruptures in the network, which may occur when nodes enter, move, fail or leave the network, when battery-power changes, when communication path characteristics change over time, and the like.

Certain types of "ad hoc" wireless networks employ beacons as a means by which nodes can discover or convey information to other nearby nodes. A beacon is a broadcast transmission that can be received by some or all of the nodes within transmission range—as opposed to a point-to-point transmission to a particular node. In some network schemes, all of the nodes in the network can broadcast beacons; in other networks, only a subset of the nodes can broadcast beacons. When a node receives a beacon message, it must extract the beacon schedule from the message and store it in memory, e.g., in a database. It then employs this database to tell it when to listen for beacons, and on which channel.

Additionally, surveyors, researchers, and other field employees often need to store PII on laptops or removable media as part of their jobs. PII located off-site could be more vulnerable to unauthorized access or disclosure because it is more likely to be lost or stolen than PII stored within the physical boundaries of the business. Businesses should identify all PII residing in their environment, including those residing on wireless devices in the field. A business cannot properly protect PII it does not know about.

SUMMARY OF THE INVENTION

Systems and methods consistent with the present invention can be used to formulate dynamic configuration updates in beacon messages, distribute among nodes in ad-hoc wireless local networks via beacon transmissions without internet connection, and to modify mobile security policy to meet the changing needs of an organization. In one aspect, the invention enables selection of random times and random communication channels, on which to transmit beacons. This element of randomness provides significant security benefits. Of course, it also makes it harder for a friendly node to know when to listen for beacon messages. Thus, in another aspect of the invention a method is provided in which information about a plurality of beacon schedules is disseminated coupled with the dynamic configuration updates through the network. Thus, when a new friendly node manages to receive even a single beacon message from any nearby network node, it can learn the beacon schedules for other nodes in the network and quickly learn all of the relevant beacon schedules. The present invention focuses on the network control messages themselves, and in particular, on the timing and transmission channel of the broadcast beacons. Policy can evolve incrementally over the system life cycle, and in large decentralized systems it is almost certain to do so. However, if management is decentralized, constraints become a mechanism by which the ability of users who can exercise administrative privileges can be restricted.

In on embodiment, a constraints management framework is provided which comprises a rule engine software to discern what data among the vast contents of a mobile device might be worth protecting, and apply appropriate safeguards accordingly. Users are only permitted to access personally identifying information (PII) through an application that tightly restricts their access to the PII, instead of permitting users to directly access the databases or files containing PII. An application may comprise a plurality of security controls driven by constraints, whereas data are stored in a plurality of segregated data storages. A representative administrative rule engine stores and manipulates knowledge obtained from data analytics and administrative configurations to interpret information in a useful way. The rule engine provides support to many types of security controls that safeguard the confidentiality of PII, which also comprises one or more of the factors for determining impact levels. Organizations control access to PII through access control policies and access enforcement mechanisms. One example is implementing role-based access control and configuring it so that each user can access only the pieces of data necessary for the user's role.

Another embodiment of the present invention enables a node to adapt its power requirements to learned beacon schedules. For example, where one or more nodes learn the beacon schedules for other nodes in the network, the node can apply power to its receiver (the whole or a portion thereof and/or other components for processing received beacons, such as a correlator for determining an underlying signal pattern, e.g., in spread spectrum systems) only at those times when it expects another node to transmit a beacon message. This will greatly reduce the power required for node operation, because powering a receiver utilizes a great deal of energy. Use of this technique enables nodes to be run for longer intervals when powered by self-contained power units. In one embodiment, a method of scheduling beacon messages is provided including the steps of selecting random times for transmitting the beacon messages, and selecting random channels for transmitting the beacon messages. In a further embodiment, a beacon message is provided which includes an identification of a node, dynamic configuration updates, and a random beacon transmission schedule for that node. In yet another embodiment, a method of generating a beacon message is provided including the steps of providing an identification of a node and a random beacon transmission schedule for that node and incorporating the identification, dynamic configuration updates, and schedule in a beacon message.

In another embodiment, a method of receiving a beacon message is provided including steps of extracting a random beacon transmission schedule for a node from the beacon message, listening at a receiver for a beacon message at a time and channel specified in the schedule, and extracting at least one additional random beacon transmission schedule for another node from any beacon message heard. In yet another embodiment, an apparatus is provided for generating a beacon message including a node having a node identifier, a random number generator for generating a node transmission schedule, and a processor for generating a beacon message including the node identifier and the schedule. In another embodiment, a method of joining a transmission network is provided including steps of selecting a random channel, listening on the selected channel for an amount of time, and if no beacon message is heard on the channel during the amount of time, repeating the selecting and the listening steps.

In another embodiment, an apparatus is provided for transmitting beacons in an ad hoc wireless local network including at least one node, wherein the node transmits beacons containing a beacon schedule, selects random times and random channels for transmission of beacons, and stores the selected times and channels in the beacon schedule. In yet another embodiment, a method for transmitting beacons in an ad hoc wireless local network without internet connection is provided including the steps of transmitting beacons containing a beacon schedule, selecting random times and random channels for transmission of beacons, and storing the selected times and channels in the beacon schedule.

In yet another embodiment, a computer-executable software code is provided stored on a computer-readable medium, the computer-executable code being for facilitating the transmission of beacons in a wireless network without internet connection, the computer-executable code including computer-executable code for transmitting beacons containing a beacon schedule, computer-executable code for selecting random times and random channels for transmission of beacons, and computer-executable code for storing the selected times and channels in the beacon schedule.

In yet another embodiment, a local network communications apparatus is provided including means for transmitting beacons without internet connection containing a beacon schedule, means for selecting random times and random channels for beacon transmissions, and means for storing the selected times and channels in the beacon schedule.

DETAILED DESCRIPTION OF THE INVENTION

According to the invention, a plug server coupled between a plurality of mobile devices may be used. In various implementations of the invention, the plug server is local to the mobile device and provides a connection to the mobile device via a short-range communications link, which may include a short-range wireless communications link. The invention may be particularly useful in areas and/or times when the mobile device experiences limited connectivity to the internet via, for example, a cellular data network or other communication link provided by a network provider.

In one embodiment, the present invention can be used to increase the probability of receiving and/or forwarding updated appropriate safeguards communicated on wireless mobile devices in ad hoc wireless local networks without internet connection, thereby serving the purpose of facilitating mobile personally identifying information (PII) collection and security administration in such networks. The present invention focuses on the network control messages themselves, and in particular, on the timing and transmission channel of the broadcast beacons. In ad hoc wireless local networks various nodes may be mobile. A high level of node mobility necessitates that the router nodes be able to respond quickly to changes in the network. More specifically, beacon messages sent by a node that is moving allows new neighbors, i.e., nodes that are now coming into the wireless communication range of the moving node, to discover the moving node. Similarly, it allows nodes that are falling out of wireless communication range to determine that the moving node is passing out of range.

Figure 1:
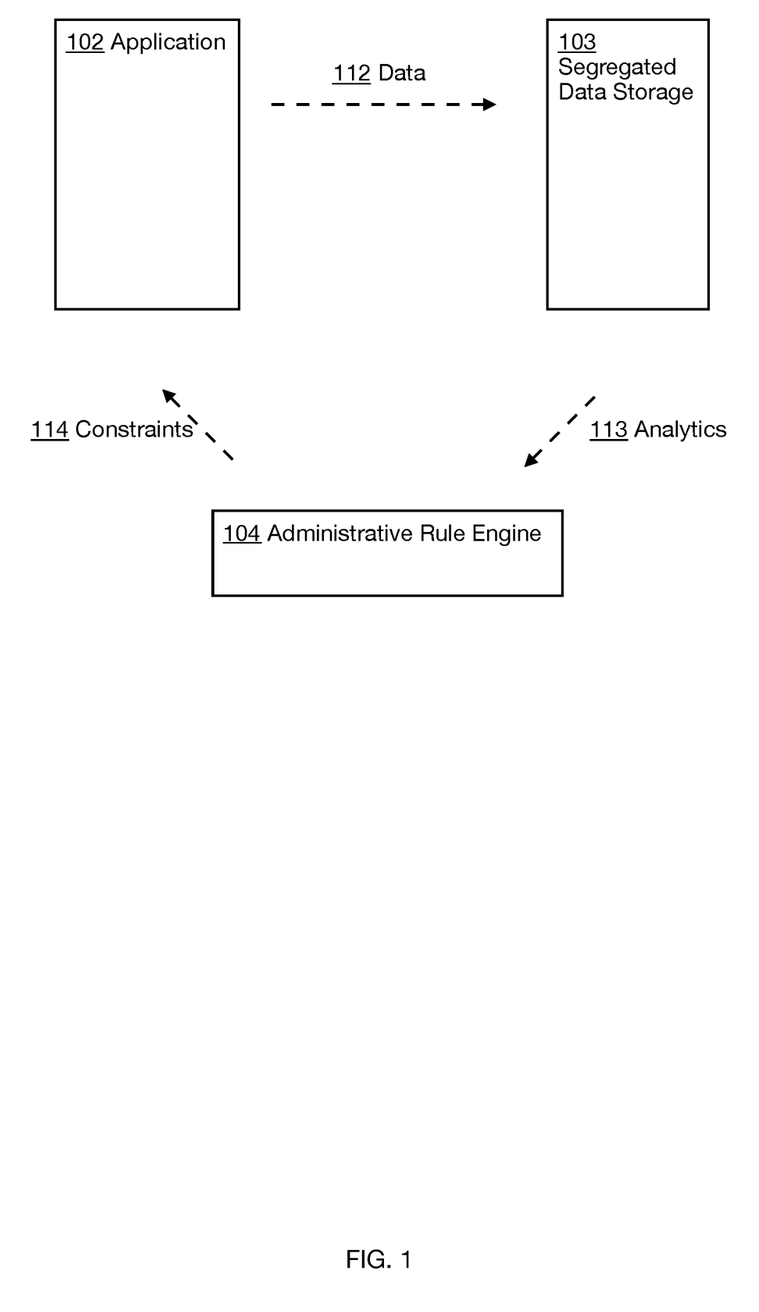
FIG. 1 is a schematic diagram illustrating one embodiment of application, segregated data storage, and administrative rule engine.

A representative mobile device comprises an application, segregated data storage, and a constraints management framework—an adaptable, modular piece of software with a range of configurable settings for distinct safeguards. Not all PII should be protected in the same way. Some PII does not need to have its confidentiality protected, such as information that the organization has permission or authority to release publicly (e.g., an organization's public phone directory). FIG. 1 illustrates a constraints management framework comprising a rule engine 104 software to discern what data 112 among the vast contents of a mobile device might be worth protecting, and apply appropriate safeguards accordingly. Users are only permitted to access PII through an application 102 that tightly restricts their access to the PII, instead of permitting users to directly access the databases 103 or files containing PII.

Figure 2:
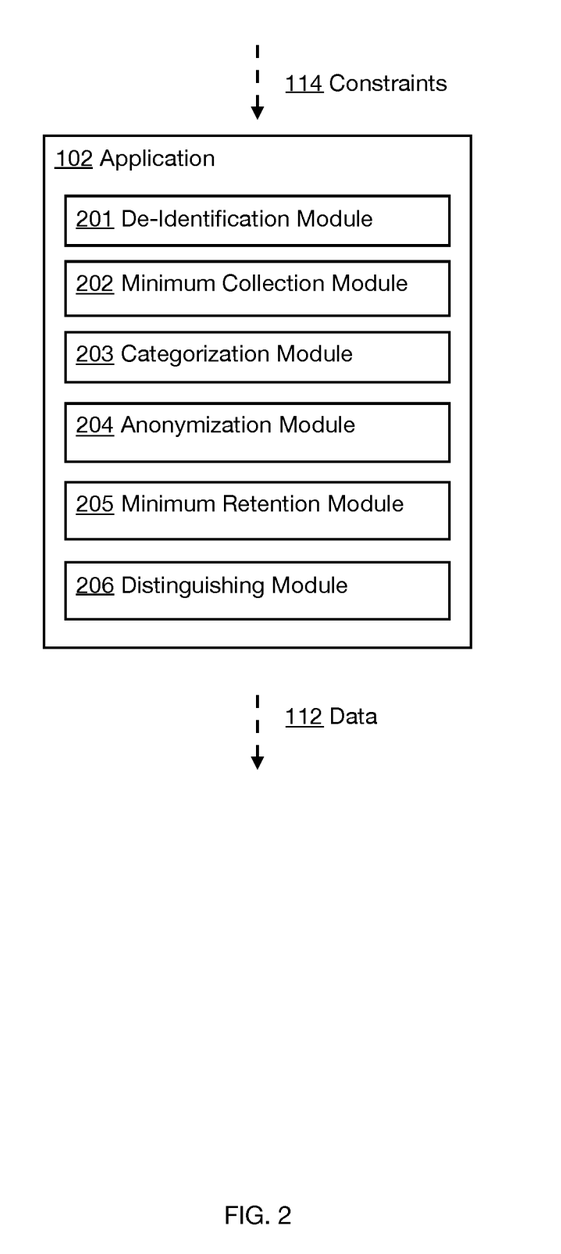
FIG. 2 is a schematic diagram illustrating one embodiment of application comprising a plurality of security controls.
Figure 3:
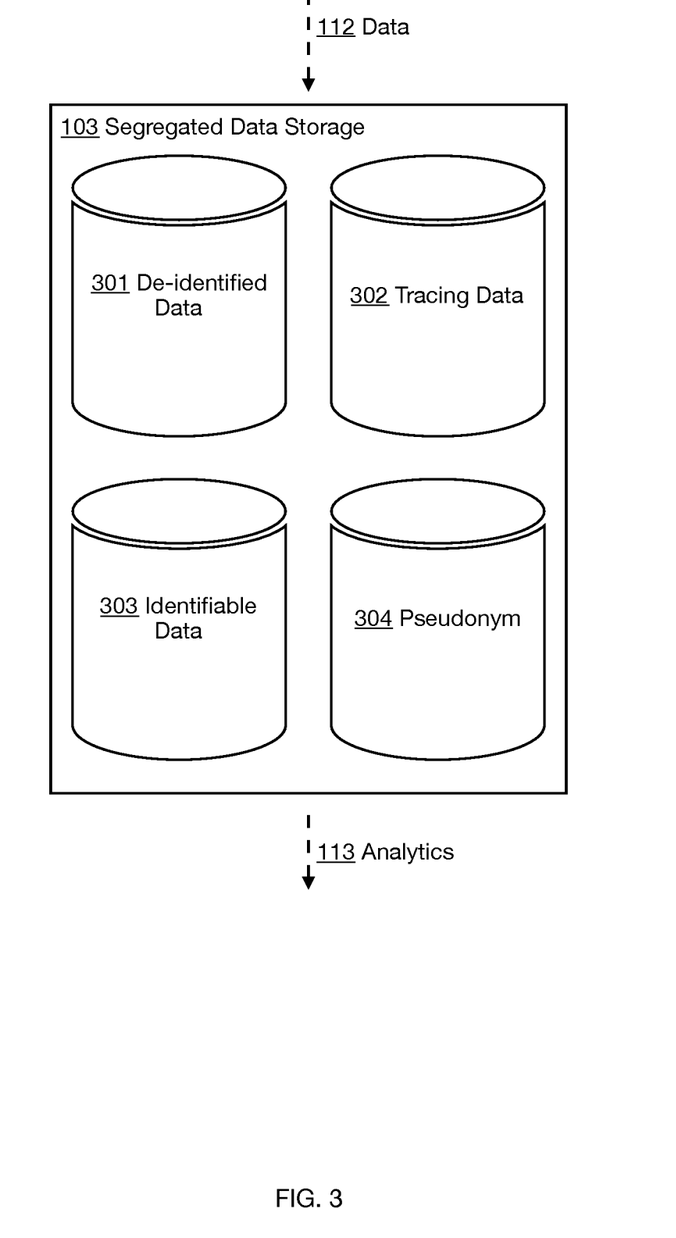
FIG. 3 is a diagram illustrating one embodiment of data storage segregation.

FIG. 2 illustrates an application 102 comprises a plurality of security controls driven by constraints 114, whereas a plurality of representative segregated data storages is shown in FIG. 3. A distinguishing module 206 is a filter that identifies all PII—any information regarding an individual maintained by an agency, as well as any information that can be used to distinguish 303 or trace 302 an individual's identity, such as name, social security number, date and place of birth, mother's maiden name, or biometric records; and any other information that is linked or linkable to an individual, like medical, educational, financial, and employment information. Full data records are not always necessary, like for some forms of research, resource planning, and examinations of correlations and trends. A de-identification module 201 is a software module that de-identify PII. The term de-identified information 301 is employed to explain records that have had enough PII removed or obscured using random 304 data that is related to a cross-reference table located in a separate system. Similarly, an anonymization module 204 may be a software module that removes enough PII such that the remaining information does not identify an individual and there is no reasonable basis to believe that the information can be used to identify an individual. De-identified records are often used when full records are not necessary, such as for examinations of correlations and trends. The term anonymized information is defined as previously identifiable information that has been de-identified and for which a code or different association for re-identification no longer exists.

Examples of PII include, but are not limited to:
Name, such as full name, maiden name, mother's maiden name, or alias
Personal identification number, such as government-issued identification card id, passport number, driver's license number, taxpayer identification number, or financial account or credit card number
Address information, like street address or email address
Personal characteristics, including photographic image (especially of face or other identifying characteristic), fingerprints, handwriting, or other biometric data (e.g., retina scan, voice signature, facial geometry)
Information regarding an individual that is linked or linkable to one of the above (e.g., date of birth, place of birth, race, religion, weight, activities, geographical indicators, employment information, medical information, education information, financial information)

Organizations are often required to identify all PII residing within their organization or under the control of their organization through a third party. Linked information is information about or related to an individual that is logically associated with other information about the individual. In contrast, linkable information is information about or related to an individual for which there is a possibility of logical association with other information about the individual. For example, if two databases contain different PII elements, then someone with access to both databases may be able to link the information from the two databases and identify individuals, as well as access additional information about or relating to the individuals. If the secondary information source is present on the same system or a closely-related system and does not have security controls that effectively segregate the information sources, then the data is considered linked. If the secondary information source is maintained more remotely, such as in an unrelated system within the organization, available in public records, or otherwise readily obtainable (e.g., internet search engine), then the data is considered linkable.

The application 102 further comprises a minimum collection module 202, which limits the amount of PII collected, and a minimum retention module 205, which limits the amount and schedules maintained. The practice of minimizing the use, collection, and retention of PII is a basic privacy principle. By limiting PII collections to the least amount necessary to conduct its mission, the organization may limit potential negative consequences in the event of a data breach involving PII. This general concept is often abbreviated as the—minimum necessary principle. PII collections should only be made where such collections are essential to meet the authorized business purpose and mission of the organization. If the PII serves no current business purpose, then the PII should no longer be used or collected. Still further, the application 102 comprises a categorization module 203 that categorizes PII by confidentiality impact level. The PII confidentiality impact level—low, moderate, or high—indicates the potential harm that could result to the subject individuals and/or the organization if PII were inappropriately accessed, used, or disclosed. Harm means any adverse effects that would be experienced by an individual whose PII was the subject of a loss of confidentiality, as well as any adverse effects experienced by the organization that maintains the PII. Harm to an individual includes any negative or unwanted effects (i.e., that may be socially, physically, or financially damaging). A breach of the confidentiality of PII at the low impact level would not cause harm greater than inconvenience, such as changing a telephone number. The types of harm that could be caused by a breach involving PII at the moderate impact level include financial loss due to identity theft or denial of benefits, public humiliation, discrimination, and the potential for blackmail. Harm at the high impact level involves serious physical, social, or financial harm, resulting in potential loss of life, loss of livelihood, or inappropriate physical detention. The module uses one or more factors for determining impact levels.

Figure 4:
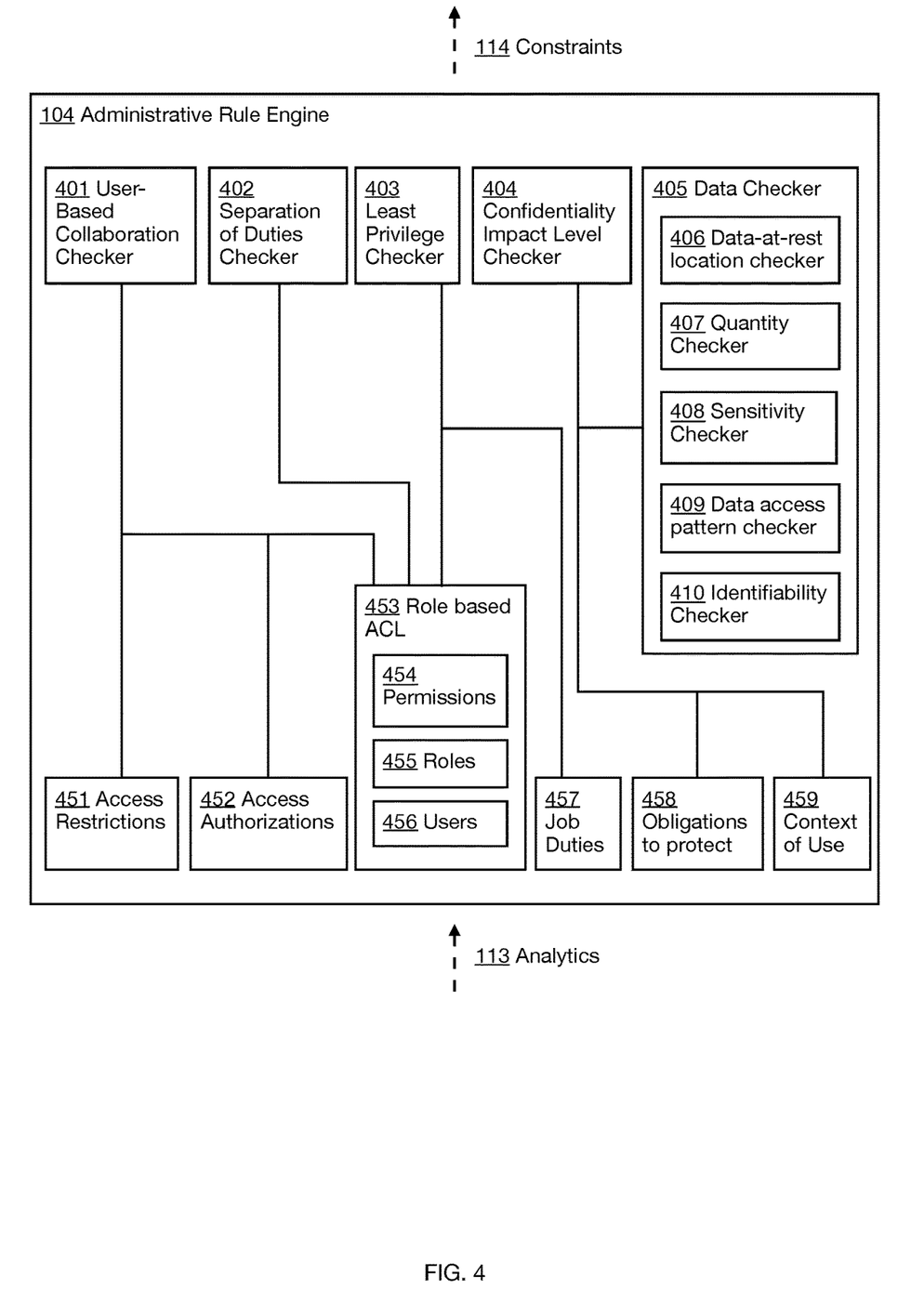
FIG. 4 is a schematic diagram illustrating one embodiment of administrative rule engine.

FIG. 4 illustrates a representative administrative rule engine 104 that stores and manipulates knowledge obtained from data analytics 113 and administrative configurations to interpret information in a useful way. The rule engine 104 provides support to many types of security controls that safeguard the confidentiality of PII, which also comprises one or more of the factors for determining impact levels. Organizations control access to PII through access control policies and access enforcement mechanisms. One example is implementing role-based access control 453 and configuring it so that each user 456 can access only the pieces of data necessary for the user's role 455. User-Based Collaboration checker 401 assists in determining whether access authorizations match access restrictions, such as contractually-based restrictions, for PII. Separation of duties checker 402 enforces security policies by ensuring that mutually exclusive roles 455 must be invoked to complete a sensitive task. Least Privilege Checker 403 ensures that users who must access records containing PII only have access to the minimum amount of PII, along with only those privileges 454 (e.g., read, write, execute) that are necessary to perform their job duties 457. Confidentiality Impact Level Checker 404 evaluates the potential harm that could result to the subject individuals and/or the organization if PII were inappropriately accessed, used, or disclosed. The evaluation is based on Obligations to Protect Confidentiality 458, which generally include laws, regulations, or other mandates that an organization is subject to, and Context of use 459, i.e. the purpose for which the PII is collected, stored, used, processed, disclosed, or disseminated. Further, Data Checker 405 represents a class of dynamic rule sets that are analytics 113 driven based on collected data. Data-at-rest location checker 406 restricts access to PII from portable and mobile devices, which are generally higher-risk than non-portable devices (e.g., desktop computers at the organization's facilities), and likewise restricts access to information system media containing PII, including include portable and mobile devices with a storage capability. Quantity checker 407 raises or lowers confidentiality impact level according to the volumes of collected PII, whereas Sensitivity Checker 408 evaluates the sensitivity of collected PII data fields to raise or lower the confidentiality impact level accordingly. Further, Identifiability checker 410 evaluates how easily PII can be used to identify specific individuals, thereby raises or lowers the confidentiality impact level accordingly. Data access pattern checker 409 takes into consideration the nature of authorized access to and the location of PII. When PII is accessed more often or by more people and systems, or the PII is regularly transmitted or transported offsite, then it raises the confidentiality impact level to indicate more opportunities the confidentiality of the PII may be compromised.

The Administrative Rule Engine 104 provides a unified framework for managing constraints 114 via net effect of dynamic configuration updates in terms of higher-level policy objectives. Constraints 114 are a powerful mechanism for restricting the ability of users 456 who can exercise administrative privileges 454, which can be viewed as the ability to modify the user assignment, permission assignment and role hierarchy relations 453. In a management model the permissions 454 that authorize these administrative operations must be explicitly defined, requiring that there be a collection of constraints 114 that determine whether or not values of various components are acceptable. Only acceptable values will be permitted. In a preferred embodiment, configurations are formulated in beacon messages transmitted among nodes in ad-hoc wireless local networks. The ability to modify policy via changing configurations to meet the changing needs of an organization is an important benefit. Policy can evolve incrementally over the system life cycle, and in large decentralized systems it is almost certain to do so. However, if management is decentralized, constraints 114 become a mechanism by which the ability of users 456 who can exercise administrative privileges 454 can be restricted.

Constraints 114 are a powerful mechanism for laying out higher-level organizational policy, specified once for a security domain and encoded into application software for the enforcing of security policies. Constraints 114 are predicates which, applied to various relations and functions, return a value of "acceptable" or "not acceptable." The policy enforced in a particular system is the net result of the precise configuration of various software components as directed by the system owner. This enables a lay out of the broad scope of what is acceptable and impose this as a mandatory requirement. The administrative rule engine 104 is policy-neutral by itself. Particular configurations can have a strong mandatory favor, while others can have a strong discretionary favor.

Figure 5:
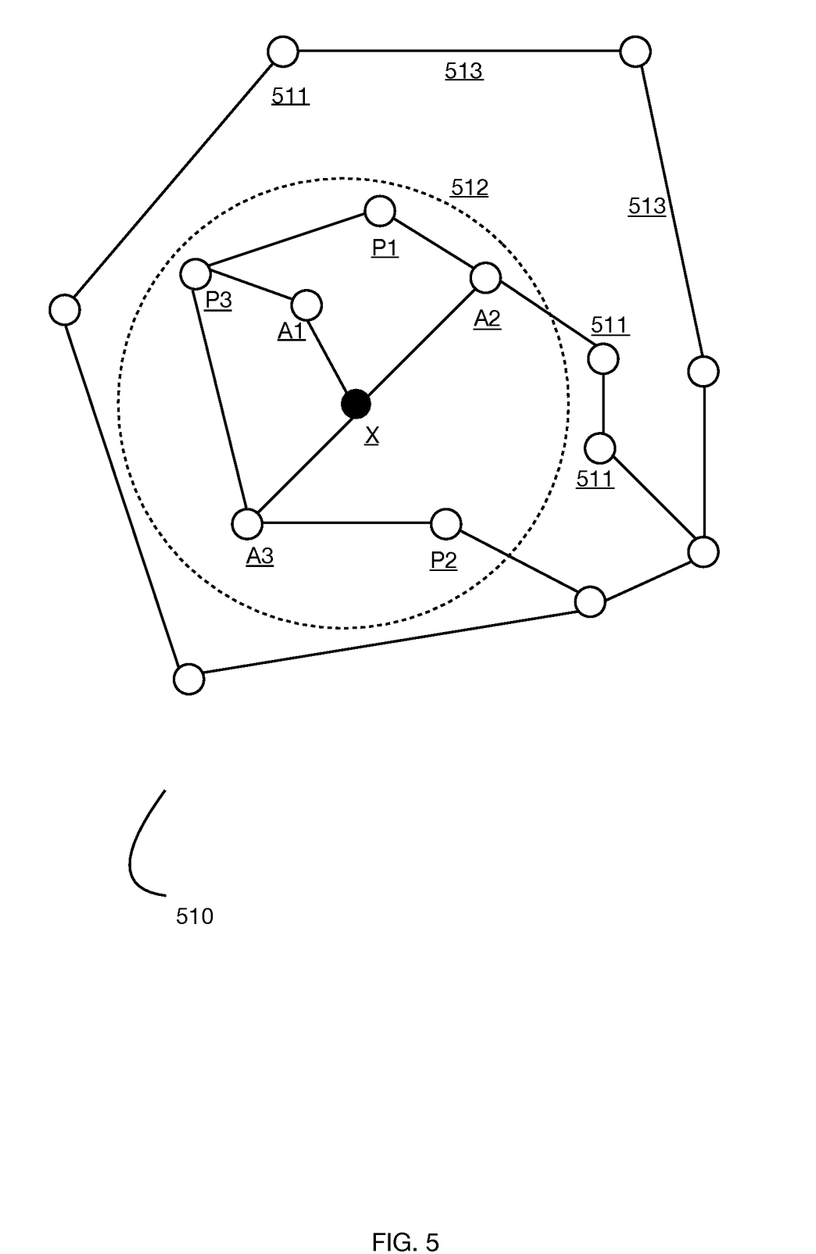
FIG. 5 is a schematic diagram illustrating one example of an ad hoc wireless local network configuration, the network including a plurality of nodes and having a select node X with a transmission range designated by a dashed circle.

FIG. 5 is a schematic diagram of a plurality of radio-frequency transmission nodes in an ad-hoc wireless local network 510, according to one embodiment of the present invention. The circles 511 represent router or endpoint nodes in the network. The solid lines 513 represent "neighbor relations" between nodes, i.e., a line connects two nodes that are capable of forwarding messages ("traffic") from one node to the other. A given node, here designated as node X, has some limit to its radio range. This limit is shown as a dashed circle 512 in FIG. 5. In reality, the range is generally not a regular shape as it depends very much on the terrain, reflections from nearby buildings and vehicles, other wireless interference, and so forth. FIG. 5 shows node X with some number of actual neighbors (nodes A1-A3) and a number of potential neighbor nodes (P1-P3), within range 512. Potential neighbors are nodes within X's range that could be used for forwarding messages, but which are not currently being so used.

While FIG. 5 illustrates a particular interconnection of the various nodes or stations shown, this configuration of connections is not limiting and other patterns of connections may be used in accordance with the present invention. Moreover, the pattern of connections may change during operation, both to accommodate the introduction of new stations and to allow for the withdrawal or movement of one or more of the nodes.

Figure 6:
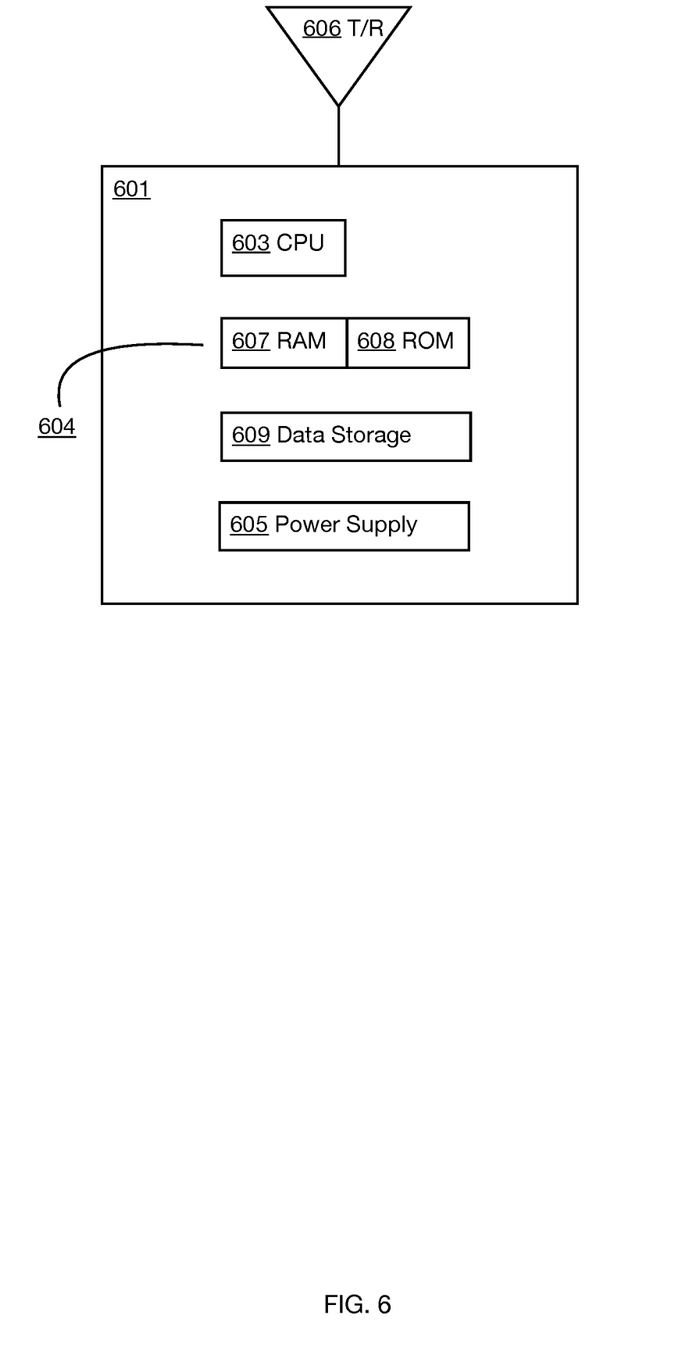
FIG. 6 is a block diagram of one embodiment of a communications node.

Each node 511 in network 510 is equipped with a wireless communications transceiver. FIG. 6 depicts an exemplary node 601 that includes a central processing unit (CPU) 603, a memory 604 comprising RAM 607 and ROM 608 (suitable for storing computer-executable software therein), a data storage medium 609, a power supply 605, and a transceiver 606 (e.g., a transmitter and a receiver). The mode of operation of each router and endpoint node is controlled by an imbedded microprocessor (e.g., the CPU) and the method of operation described in this embodiment is intended to be implemented automatically by the programming of the microprocessors.

Figure 7:
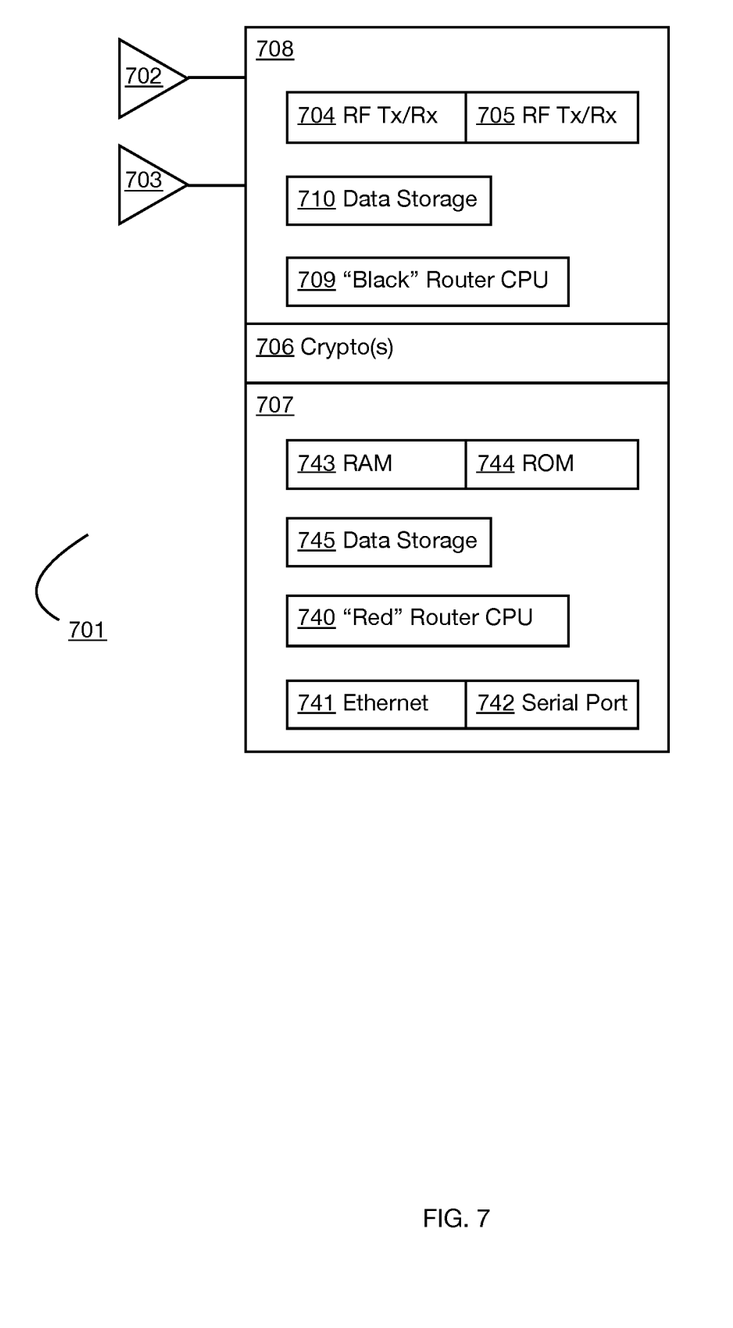
FIG. 7 is a block diagram of another embodiment of a communications node.

Alternatively, a mobile station may include more than one transmitter and/or more than one receiver, and optionally other interfacing ports, such that the station is able to simultaneously communicate with more than one other station. Communication with multiple stations can occur, for example, through different channels (or "communication links"), and/or by transmitting specific identifying information (or "coded information") for each intended source or target. FIG. 7 shows an alternative hardware scheme for a node 701 in an ad hoc wireless local network. This particular example has two antennae 702 and 703, a different antenna being associated with each of two radio frequency transceivers (RF TX/RX) 704 and 705. It also includes a cryptographic unit ("crypto") 706 that partitions the hardware into a red side 707 and a black side 708. On the black side, there is a router CPU 709 associated with the two radio transceivers. On the red side, there is another router CPU 740 associated with RAM and ROM memory, data storage medium 745, and two wired network ports, an Ethernet port 741 and a serial port 742.

Each node that will transmit "beacon messages" must determine a schedule that will govern: a) when the beacons are to be transmitted, and b) on what channel the beacons will be transmitted. As an example, a given node may determine a portion of a beacon schedule as follows: transmit beacon number 1 at 3.85 seconds from now at 42.356 MHz (mega-hertz); transmit beacon number 2 at 17.93 seconds after that at 13.447 MHz; and so forth. Such a schedule may have an indeterminate number of entries in it, in order to govern the times and channels at which beacons will be transmitted for an indefinite future. The schedule may incorporate random times and random channels by deriving information from a random number generator.

Figure 8:
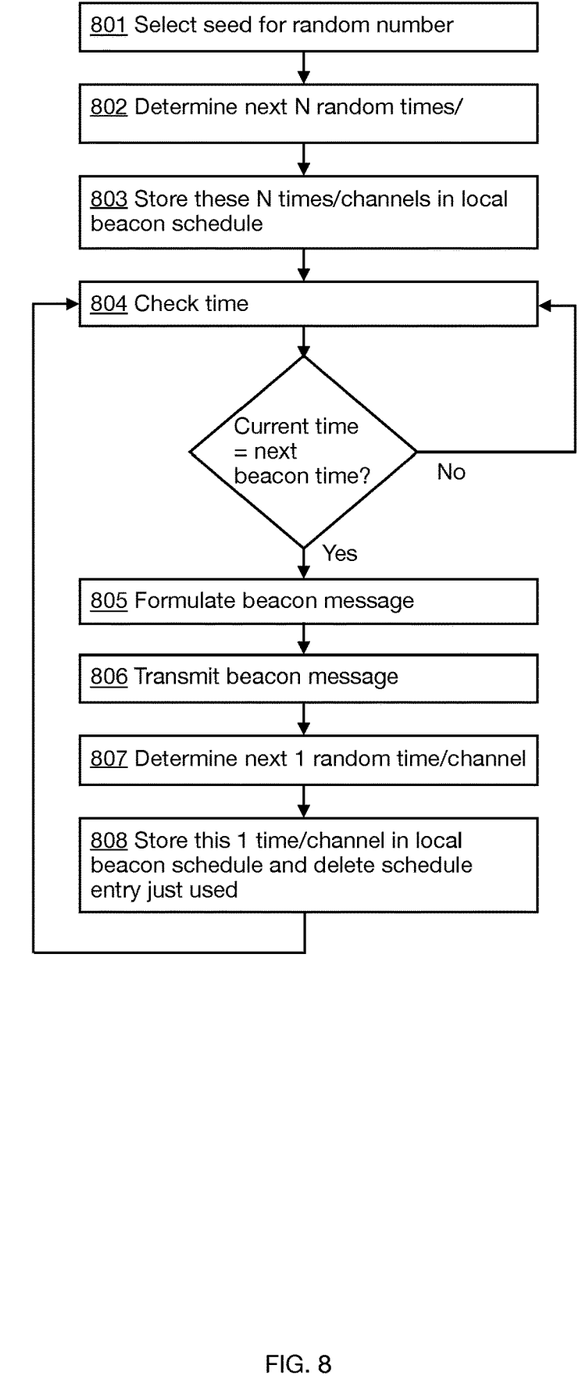
FIG. 8 is a flowchart illustrating one procedure for determining a beacon schedule and for transmitting broadcast beacons according to one method embodiment of the invention.

One algorithm or procedure for a node to determine its beacon schedule, and transmit beacons accordingly, is illustrated in the flowchart of FIG. 8. In step 801, a series of random numbers are produced from a random number generator. In step 802, the next N times/channels are determined based on the series of random numbers. In step 803, these associated time/channel values (with respect to the current time) are stored into a local (i.e., specific to this one node) beacon schedule. In step 804, the schedule is inspected (with respect to the current time) to determine when/how to transmit the next beacon. In step 805, a beacon message is formulated. In step 806, the beacon message is transmitted in accordance with the scheduled time and channel. In step 807, a next one time/channel is determined based on the series of random numbers. In step 808, this new time/channel entry is added to the local beacon schedule, and the scheduled entry just used is deleted. The procedure then goes back to step 804, to inspect the beacon schedule and determine when/how to transmit the next beacon.

In accordance with this algorithm, the schedule contains a "rolling window" of the next N times that the node will transmit beacons. When the next time occurs, the node uses the first item in the schedule, transmits a beacon accordingly, and then creates a new schedule entry that is "added on" after the items already in the window, and deletes the just used entry. In other embodiments for example, a predetermined number of next times/channels may be utilized before exiting (returning from) the routine.

In accordance with one embodiment of the invention, every beacon message from node X contains an indication of the next N times/channels at which beacons will be transmitted by node X. This allows any node that receives such a beacon to determine the next N times/channels that it should tune in to and receive subsequent beacons from the source node X.

Figure 9:
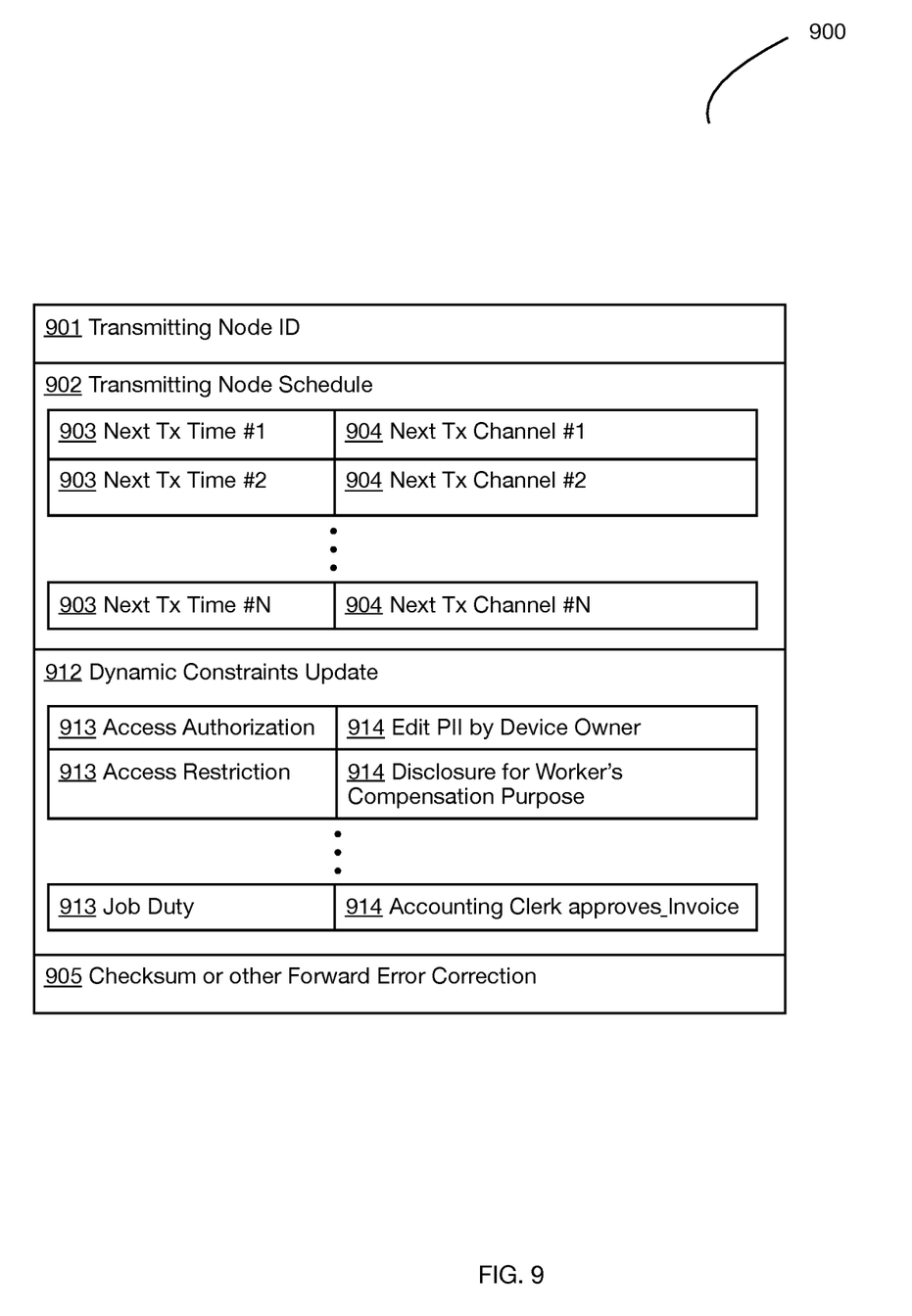
FIG. 9 is a diagram illustrating one format of a broadcast beacon in accordance with an embodiment of the invention.

FIG. 9 shows a sample format for such a beacon message 900. While the content and format of the beacon message may vary, the beacon should contain at least the transmitting node's ID 901, which is a unique identifier for that node, dynamic configuration updates 912 for managing constraints 114 in terms of higher-level policy objectives, and all or a portion of the transmitting node's schedule 902. Here, the schedule includes the next one to N times 903 (and associated channels 904) that the transmitting node will transmit a beacon message. In this example, the beacon message further includes a checksum or other forwarding error correction 905 to ensure reliable delivery.

When a node receives a beacon message, it must extract the beacon schedule from the message and store it in memory, e.g., in a database. It then employs this database to tell it when to listen for beacons, and on which channel.

For a newly joining node which does not have at least one schedule entry in its database, for example one that has just been powered on and that knows nothing about the network, the node turns on its receiver for an indefinite amount of time, until it has begun to listen on a channel that is being used for a beacon message. Here, the late arriver must supply power to its receiver continuously until it finally joins the network. At this point, it may enter a power-saving mode (if so desired, i.e., it can turn on its receiver only at times for which a beacon is expected). The late arriver can either transmit beacon messages while acting as a late arriver (waiting to hear from another node), or it may remain silent and only begin transmitting beacons at some later point, or indeed may never transmit any beacons.

Figure 10:
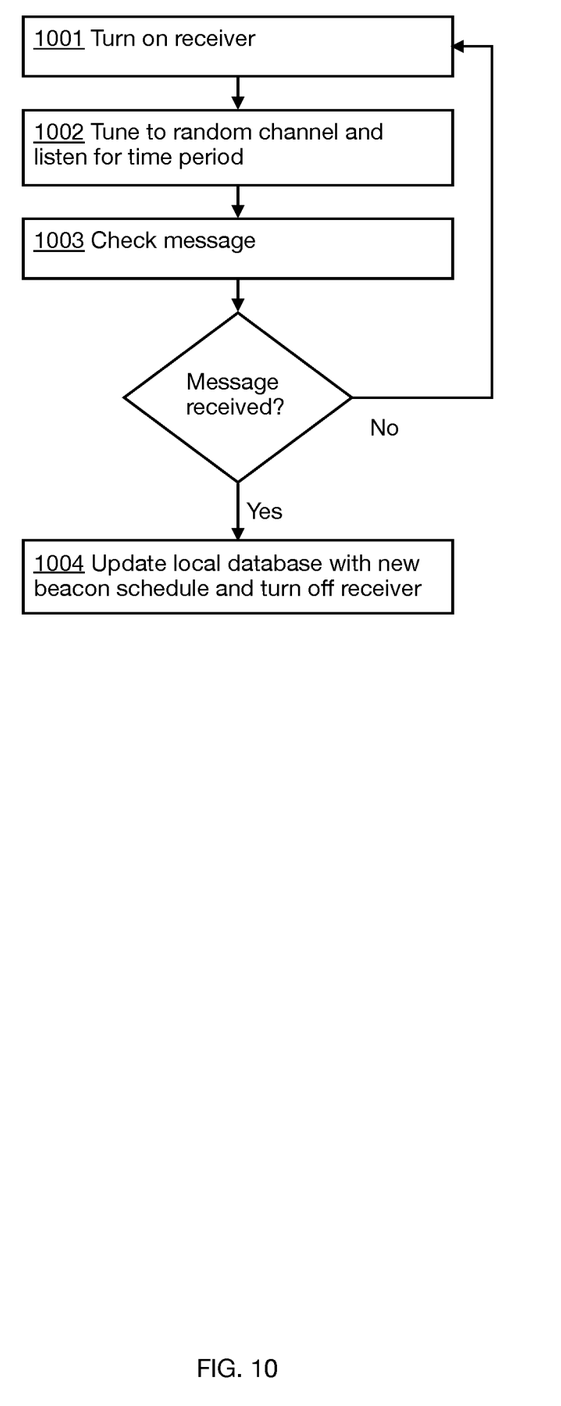
FIG. 10 is a flowchart illustrating a procedure allowing a node to join a network according to one embodiment of the invention; in addition, the procedure will allow a node to learn of a partitioned set of nodes according to another method embodiment of the invention.

The flowchart in FIG. 10 illustrates this procedure. In step 1001, a joining node or "late arriver" turns on its receiver. In step 1002, the node tunes to a random channel and listens for some interval of time. In step 1003, if no beacon message is received during this time interval, it returns to step 1002. In step 1003, if the node receives a beacon message it proceeds to step 1004 and enters the beacon schedule information from that message into its local schedule database, and exits the procedure.

Figure 11:
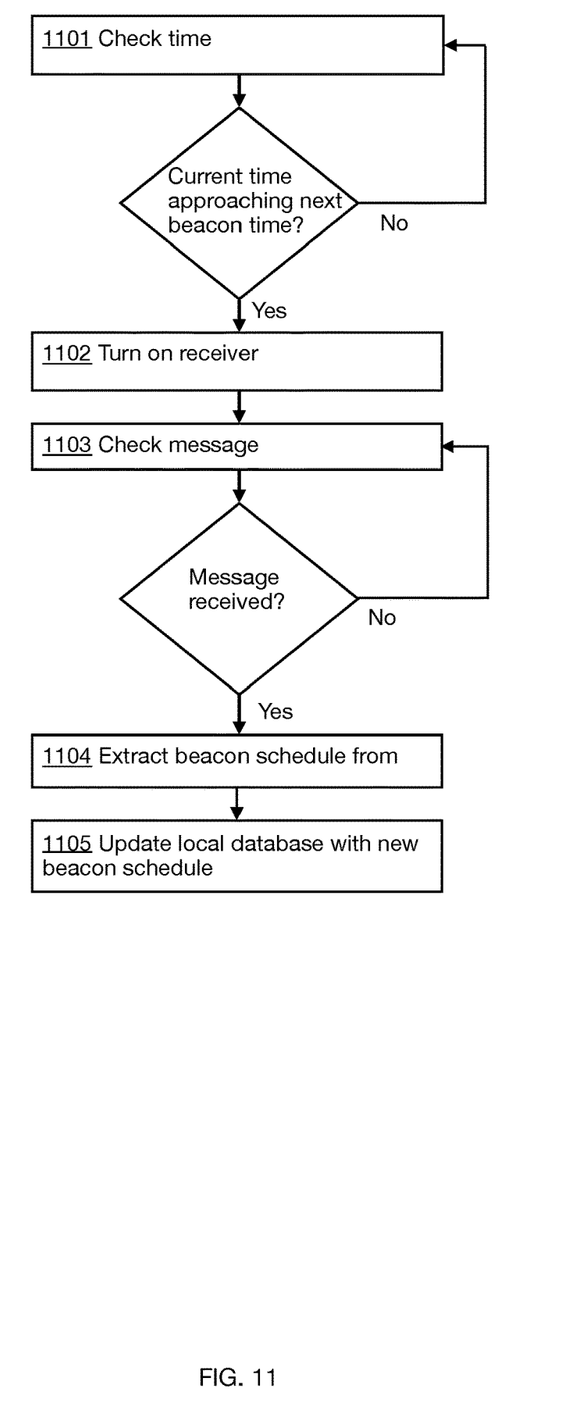
FIG. 11 is a flowchart illustrating a procedure for processing a received broadcast beacon according to one method embodiment of the invention.

The receiving node may perform an algorithm in accordance with the procedure shown in FIG. 11. In step 1101, the receiving node determines whether the current time is approaching a time at which the next beacon will be transmitted, by finding the minimum of all entries in the local database, i.e., get ready to receive a beacon from the next node that is going to send one. In step 1102, the receiver is turned on, shortly in advance of the anticipated transmission time, where the advance compensates for possible clock drifts between the transmitting node and this local node. In step 1103, the node checks to see if the message was correctly received. If the message was correctly received, the beacon schedule information is extracted from the received beacon message in step 1104. In step 1105, the local database is updated with this new beacon schedule information.

In this embodiment, the beacon message contains schedules in "delta" time, e.g., the next transmission will be in 1.3 seconds from now. The receiving node must map this to its internal clock time as it copies the schedule into its local database, e.g., next transmission expected at 1:15:03.3 in my local clock time. Alternatively, all nodes in the network may employ a globally synchronized clock, e.g., by using global positioning system receivers.

An alternative full format beacon message contains both the "local" schedule previously described, plus selected schedules of other nodes contained in the transmitting node's local schedule database. Thus, it contains both information about when this particular node is going to transmit its next beacon, and information about when other nodes in the network are going to transmit their beacons, respectively.

Figure 12:
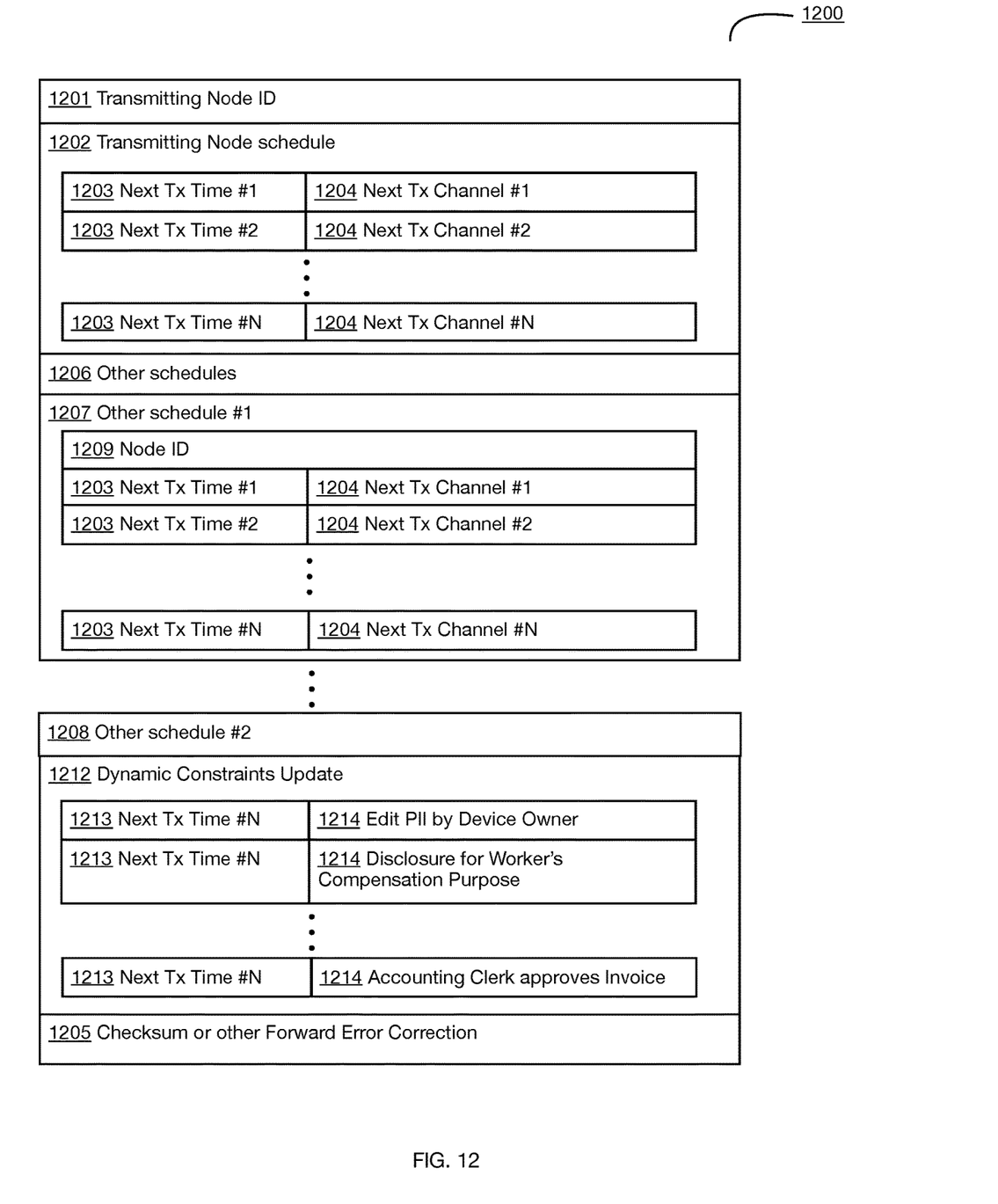
FIG. 12 is a diagram illustrating another format of a beacon message according to another embodiment of the invention.

FIG. 12 is a diagram illustrating a full format beacon message 1200. The message is similar to the simple format, in regard to including the transmitting node's ID 1201 and schedule 1202, as well as a checksum or forward error correction 1205, but the message 1200 also contains a variable number of "other" node schedules 1206 in addition to the transmitter's own schedule 1202. Here all schedules have the same internal format 1203, 1204, except that "other schedules" 1207 to 1208 also contain an associated identifying node ID 1209 for each other schedule.

An advantage of using the full format beacon message is that when any given node receives a beacon message, it can then determine information about the beacon schedules for other nodes in the network. Thus, in small networks, it would be practical to include in one beacon message the beacon schedules of all other nodes. This would enable the receiving node to "tune in" to all nodes in the network and, if in range, receive all their beacons. Thus, just a single beacon message would provide enough information so that a node can fully join the network, i.e., receive all necessary beacons.

In larger networks, there may be too much schedule information to fit into a single beacon message. Then, the transmitting node may select some subset of the full schedule database to transmit. For example, it could be a random subset, a round robin subset, a subset that includes the "most important" set of nodes in the network, one that biases the selection of nodes according to some configured parameters or observed traffic flows, etc. However the subset is selected, the receiver will only learn this subset. But, once having learned this subset the receiver can effectively "bootstrap" itself to learn more about the full network, since it can immediately start "tuning in" on the other nodes listed in the subset schedule. These other nodes, in turn, are likely to transmit different subsets in their other beacon schedules, and so forth. As a result, even in a very large network, a given receiver can very quickly learn about most or all of the other nodes in the network.

From time to time, one or more nodes in the network begins to execute the late arriver algorithm (e.g., of FIG. 10), even though the node has already joined in the network. The node may execute this algorithm for some fixed amount of time, and then revert to its normal behavior. Thus, when executing the late arriver algorithm, it will scan through random wireless channels to see if there some beacon being transmitted that it does not already know about. If so, it will incorporate the schedules from that beacon into its own local database, and thus quickly propagate the schedules to other nodes in its partition because they will be included in subsequent beacon transmissions. As a result, the partition will be quickly healed as all nodes learn about each other.

The invention claimed is:

1. An apparatus for a network node to schedule transmission of a beacon message, wherein an administrative rule engine applies security safeguards to modify PII collection policies of the node, the apparatus comprising:
   a constraint management framework for determining PII that are worth protecting and applying security safeguards to the determined PII;
   a node having an application collecting data to reside in at least one segregated data storage, the application comprises a distinguishing module, a de-identification module, an anonymization module, a minimum collection module, a minimum retention module, and a categorization module;
   constraints encoded into the application, wherein the constraint management framework manages the constraints to enforce the PII collection policies in terms of higher-level policy objectives;
   a random number generator for generating random times for transmitting the beacon message and for generating random channels for transmitting the beacon message; and
   a message generator for generating the beacon message, wherein the beacon message includes
      dynamic configuration updates for the administrative rule engine to apply security safeguards in relation to the application, wherein the dynamic configuration updates comprises obligations to protect confidentiality, context of use, user assignments, permission assignments, role hierarchy relations, access authorizations, access restrictions, and job duties.

2. The apparatus of claim 1, further including a storage device for storing the beacon transmission schedule of the network node.

3. The apparatus of claim 1, further including a network node including a transmitter for transmitting beacon messages at the generated times and channels.

4. The apparatus of claim 3, wherein the transmitter generates beacon messages on wireless channels.

5. The apparatus of claim 3, wherein the network node further includes a receiver for receiving beacon messages.

6. The apparatus of claim 1, wherein the apparatus further includes a transceiver and a power supply for selectively applying power to at least a portion of the transceiver.

7. The apparatus of claim 1, wherein the beacon transmission schedules for the node and the plurality of other network nodes each include transmission times for beacon messages in an ad hoc wireless network.

8. The apparatus of claim 1, wherein the dynamic configuration updates further comprises beacon transmission schedules indicating when a plurality of other network nodes will transmit beacons.

9. An apparatus for generating a beacon message, wherein the beacon message provides dynamic configuration updates to an administrative rule engine for applying security safeguards to modify PII collection policies, the apparatus comprising:
- a constraint management framework for determining PII that are worth protecting and applying security safeguards to the determined PII;
- a node having a node identifier and an application collecting data to reside in at least one segregated data storage, the application comprises a distinguishing module, a de-identification module, an anonymization module, a minimum collection module, a minimum retention module, and a categorization module;
- constraints encoded into the application, wherein the constraint management framework manages the constraints to enforce the PII collection policies in terms of higher-level policy objectives;
- a random number generator for generating a node beacon transmission schedule; and
- a processor for generating a beacon message including the node identifier, the beacon transmission schedule, a plurality of additional node identifiers, beacon transmission schedules indicating when a plurality of nodes identified by the plurality of additional node identifiers will transmit beacons, and dynamic configuration updates for the administrative rule engine to apply security safeguards in relation to the application, wherein the dynamic configuration updates comprise obligations to protect confidentiality, context of use, user assignments, permission assignments, role hierarchy relations, access authorizations, access restrictions, and job duties.

10. An apparatus for transmitting beacons in a wireless ad hoc network, wherein the beacon instructs an administrative rule engine to apply security safeguards to modify PII collection policies, the apparatus comprising:
- a constraint management framework for determining PII that are worth protecting and applying security safeguards to the determined PII;
- constraints encoded into an application, wherein the constraint management framework manages the constraints to enforce the PII collection policies in terms of higher-level policy objective; and
- at least one node, said node
  - selecting random times and random channels for transmission of beacons,
  - storing the selected times and channels in at least one of at least three beacon transmission schedules, wherein the at least three beacon transmission schedules indicate when a plurality of nodes in the network will transmit beacons, and
  - transmitting beacons containing the at least three beacon transmission schedules, and dynamic configuration updates providing for the administrative rule engine, wherein the dynamic configuration updates comprise obligations to protect confidentiality, context of use, user assignments, permission assignments, role hierarchy relations, access authorizations, access restrictions, and job duties.

11. The apparatus of claim 10, wherein the node is equipped with a wireless communications transceiver.

* * * * *